United States Patent
Zakharov et al.

(10) Patent No.: US 12,136,251 B2
(45) Date of Patent: Nov. 5, 2024

(54) GUIDED DOMAIN RANDOMIZATION VIA DIFFERENTIABLE DATASET RENDERING

(71) Applicant: Toyota Research Institute, Inc., Los Altos, CA (US)

(72) Inventors: Sergey Zakharov, Los Altos, CA (US); Rares Ambrus, San Francisco, CA (US); Vitor Guizilini, Santa Clara, CA (US); Adrien Gaidon, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 375 days.

(21) Appl. No.: 17/579,370

(22) Filed: Jan. 19, 2022

(65) Prior Publication Data

US 2023/0154145 A1    May 18, 2023

Related U.S. Application Data

(60) Provisional application No. 63/279,416, filed on Nov. 15, 2021.

(51) Int. Cl.
*G06V 10/70* (2022.01)
*G06T 15/50* (2011.01)
(Continued)

(52) U.S. Cl.
CPC .............. *G06V 10/76* (2022.01); *G06T 15/50* (2013.01); *G06V 10/60* (2022.01); *G06V 10/774* (2022.01); *G06V 10/82* (2022.01)

(58) Field of Classification Search
CPC ...... G06V 10/76; G06V 10/60; G06V 10/774; G06V 10/82; G06T 15/50; G06T 15/506
(Continued)

(56) References Cited

U.S. PATENT DOCUMENTS

| 10,901,740 B2 | 1/2021 | Planche et al. |
| 2019/0051056 A1* | 2/2019 | Chiu ............. G06F 16/903 |

(Continued)

FOREIGN PATENT DOCUMENTS

| CN | 112435190 A | 3/2021 |
| EP | 3696717 A1 | 8/2020 |

(Continued)

OTHER PUBLICATIONS

Zakharov et al., DeceptionNet: Network-Driven Domain Randomization, published 2019, pp. 532-541; (https://openaccess.thecvf.com/content_ICCV_2019/papers/Zakharov_DeceptionNet_Network-Driven_Domain_Randomization_ICCV_2019_paper.pdf).

(Continued)

*Primary Examiner* — Neil R McLean
(74) *Attorney, Agent, or Firm* — DINSMORE & SHOHL LLP (57) ABSTRACT

In accordance with one embodiment of the present disclosure, a method includes receiving an input image having an object and a background, intrinsically decomposing the object and the background into an input image data having a set of features, augmenting the input image data with a 2.5D differentiable renderer for each feature of the set of features to create a set of augmented images, and compiling the input image and the set of augmented images into a training data set for training a downstream task network.

17 Claims, 5 Drawing Sheets

(51) Int. Cl.
*G06V 10/60* (2022.01)
*G06V 10/75* (2022.01)
*G06V 10/774* (2022.01)
*G06V 10/82* (2022.01)

(58) Field of Classification Search
USPC .......................................................... 382/156
See application file for complete search history.

(56) References Cited

U.S. PATENT DOCUMENTS

2019/0347526 A1* 11/2019 Sunkavalli ............. G06N 3/084
2020/0167161 A1*  5/2020 Planche ................. G06F 9/328
2020/0356712 A1  11/2020 Rejeb et al.
2020/0356899 A1  11/2020 Rejeb et al.
2021/0141995 A1   5/2021 Lundgaard et al.
2021/0232926 A1*  7/2021 Hutter ................... G06F 18/21

FOREIGN PATENT DOCUMENTS

WO   WO-2018075053 A1 *  4/2018
WO      2021061710 A1     4/2021

OTHER PUBLICATIONS

Leon Sixet et al., RenderGAN: Generating Realistic Labeled Data, published Jun. 8, 2018, Frontiers in Robotics and AI, V5, Article 16, pp. 1-9, (https://arxiv.org/pdf/1611.01331.pdf).

* cited by examiner

GUIDED DOMAIN RANDOMIZATION VIA DIFFERENTIABLE DATASET RENDERING

CROSS-REFERENCE TO RELATED APPLICATION

This application claims the benefit of U.S. Provisional Application No. 63/279,416 filed Nov. 15, 2021, which is hereby incorporated by reference in its entirety.

TECHNICAL FIELD

The present disclosure relates to training neural networks, and more particularly to training neural networks with augmentations of real-world data.

BACKGROUND

Neural networks typically require large amounts of labeled data to generate reliable models. Generating labeled data is an expensive and time-consuming task. As a result, synthetic data has become a topic of interest. Synthetic data includes computationally generated data designed to replicate a particular label, and thus synthetic data is labeled with little to no cost. However, synthetic data often lacks realism and often fails to capture nuances in similar real-world data. In terms of performance, neural networks trained on synthetic data fall behind their counterparts trained on real data due to their domain gap. That is, neural networks trained on data collected in one domain generally have poor performance in other domains.

The gap between the domains is typically bridged with adaptation and/or randomization techniques. In the case of supervised domain adaptation approaches, a certain amount of labeled data from the target domain exists. In unsupervised approaches, the target data is available but unlabeled. In both cases, the goal is to match the source and target distributions by finding either a direct mapping, a common latent space, or through regularization of task networks trained on the source data. Recent unsupervised approaches are mostly based on generalized adversarial networks, and although these methods perform proper target domain transfers, they can overfit to the chosen target domain and exhibit a decline in performance for unfamiliar samples. Domain randomization methods have no access to any target domain and randomly perturb source data during training to make the task networks more robust to perceptual differences. Though effective, this approach is generally unguided and often needs an exhaustive evaluation to find meaningful augmentations that increase the target domain performance. Furthermore, results from pixel-level adversarial attacks suggest the existence of architecture-dependent effects that cannot be addressed by "blind" domain randomization for robust transfer.

Therefore, intelligent strategies for generating synthetic data that improve the generalization of neural networks trained on the generated synthetic data are desired.

SUMMARY

In accordance with one embodiment of the present disclosure, a method includes receiving an input image having an object and a background, intrinsically decomposing the object and the background into an input image data having a set of features, augmenting the input image data with a 2.5D differentiable renderer for each feature of the set of features to create a set of augmented images, and compiling the input image and the set of augmented images into a training data set for training a downstream task network.

In accordance with another embodiment of the present disclosure, a system includes a processor and a memory module that stores machine-readable instructions. The machine-readable instructions, when executed by the processor, cause the processor to perform operations including receiving an input image having an object and a background, intrinsically decomposing the object and the background into an input image data having a set of features, augmenting the input image data with a 2.5D differentiable renderer for each feature of the set of features to create a set of augmented images, and compiling the input image and the set of augmented images into a training data set for training a downstream task network.

In accordance with yet another embodiment of the present disclosure, a non-transitory computer-readable medium has machine-readable instructions that, when executed by a processor, cause the processor to perform operations includes receiving an input image having an object and a background, intrinsically decomposing the object and the background into an input image data having a set of features, augmenting the input image data with a 2.5D differentiable renderer for each feature of the set of features to create a set of augmented images, and compiling the input image and the set of augmented images into a training data set for training a downstream task network.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods and systems for guided domain randomization via differentiable dataset rendering. Embodiments disclosed herein are guided in that they rely on task-adaptive domain randomization. Embodiments build a differentiable dataset that stores object material properties and approximates a material-based ray tracer to produce augmentations that maximize the uncertainty of the downstream task. Unlike other adaptation techniques for bridging the domain gap, embodiments of the president disclosure require no real data, which spares the expensive task of object material fitting and can be applied to monocular single shot 6D object detection on full size camera images.

Figure 1:
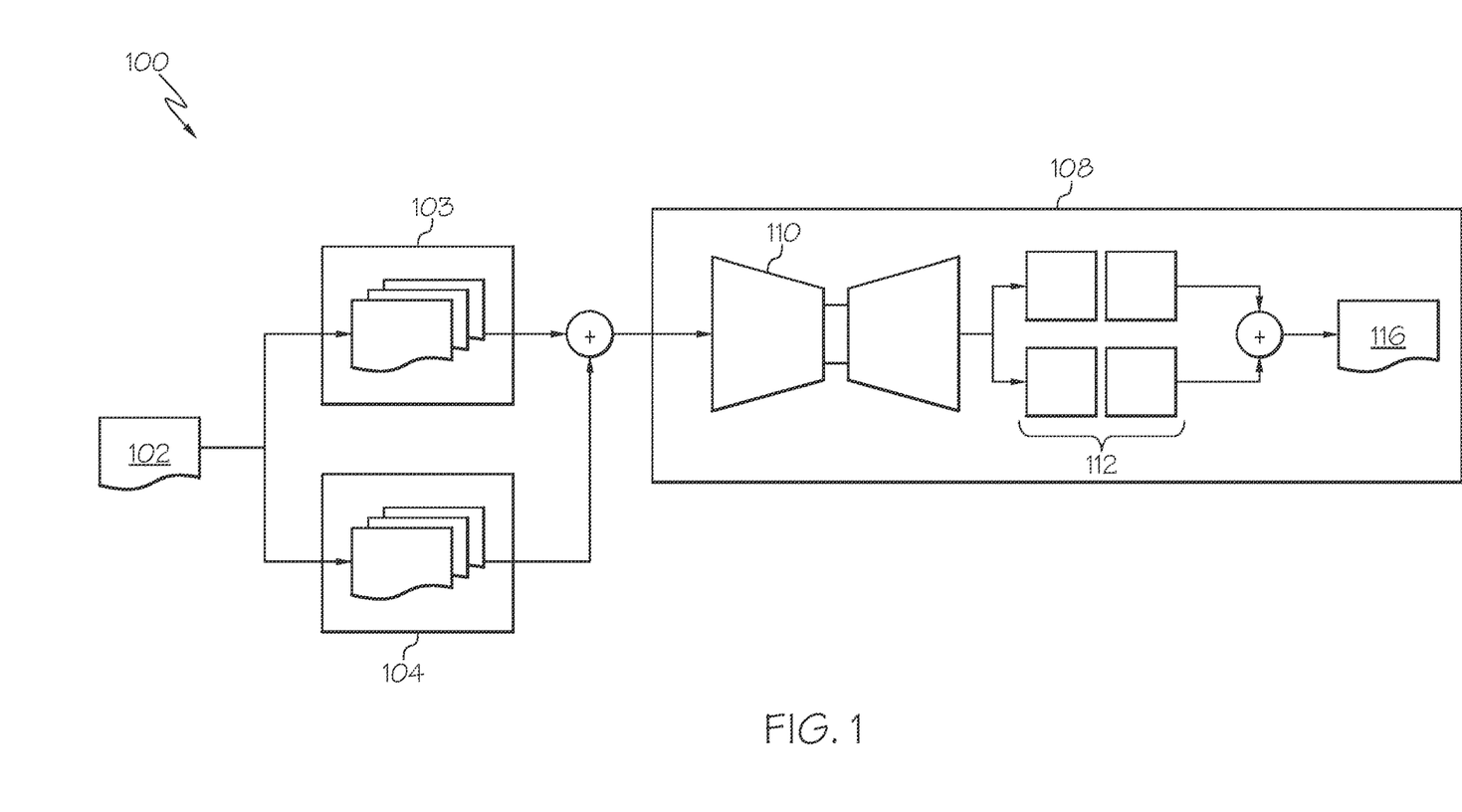
FIG. 1 depicts an illustrative workflow for generating training data for a downstream task network, according to one or more embodiments shown and described herein.

Referring now to FIG. 1, a workflow 100 for generating training data for a downstream task network is depicted. The workflow is modular, composed of different neural networks for materials, lighting, and rendering, which enables randomization of different image generation components. The workflow process begins with an input image 102. The input image 102 may be an image such as a real image, a rendered image, a synthetic image, or any other kind of image data. With the input image 102, a differentiable dataset is created that stores object material properties and object light properties and approximates a physics-based ray tracer.

The object material properties are determined by a material network 103. The material network 103 may be a coordinate-based multi-layer perceptron (MLP) that is trained to output material properties for each of the objects present in the input image 102 as well as the background environment. The material network 103 may receive a set of 3D coordinates of one or more target objects. The material network 103 may then analyze the input image 102 with the MLP to determine at least the color, specularity, and/or roughness properties of the target objects and compose 2D maps for each output property of the target objects. The material network 103 may further compile positions, normal, and materials for each surface of the target objects into a g-buffer.

Similarly, object light properties are determined by a lighting network 104. The lighting network 104 may be a coordinate-based MLP that is trained to output lighting features for each of the objects present in the input image 102 as well as the background environment. The lighting network 104 may receive a set of 3D coordinates of one or more target objects and a set of randomized 3D coordinates for a light source. The lighting network 104 may then analyze the input image 102 with the MLP to parametrize the input image 102. Parametrizing the input image 102 may be performed by creating at least two light maps: one light map that defines the direction to the light source from each visible coordinate and another light map that defines the distance to the light source. As a result, the MLP outputs at least one simulated lighting condition created by the light source on the target objects of the input image 102. Because the 2.5D differentiable renderer 108 is fully differentiable, the output of the lighting network 104 may be used to recover lighting parameters from the input image 102, particularly when combined with a correspondence-based object detector.

The outputs of the material network 103 and the lighting network 104 may be synthesized as input to the 2.5D differentiable renderer 108. The 2.5D differentiable renderer 108 may comprise an encoder-decoder convolutional neural network 110 that receives at least material properties and/or lighting conditions as input. The encoder-decoder convolutional neural network 110 may output a plurality of intermediate images 112 under direct and indirect lighting conditions. The plurality of intermediate images 112 under direct and indirect lighting conditions may also have a plurality of intermediate images 112 under different material properties. Different material properties may include varying levels of lighting diffusion, such as diffuse and glossy. The final image 116 may be computed by combining the plurality of intermediate images 112, such as by linear combinations, overlaying, synthesizing, concatenating, and/or any other method of combining images. In some embodiments, the 2.5D differentiable renderer 108 may also apply a non-linear tone mapping to fit the final image 116 the color gamut of a display device so that the device may properly render the colors of the final image 116.

Figure 2:
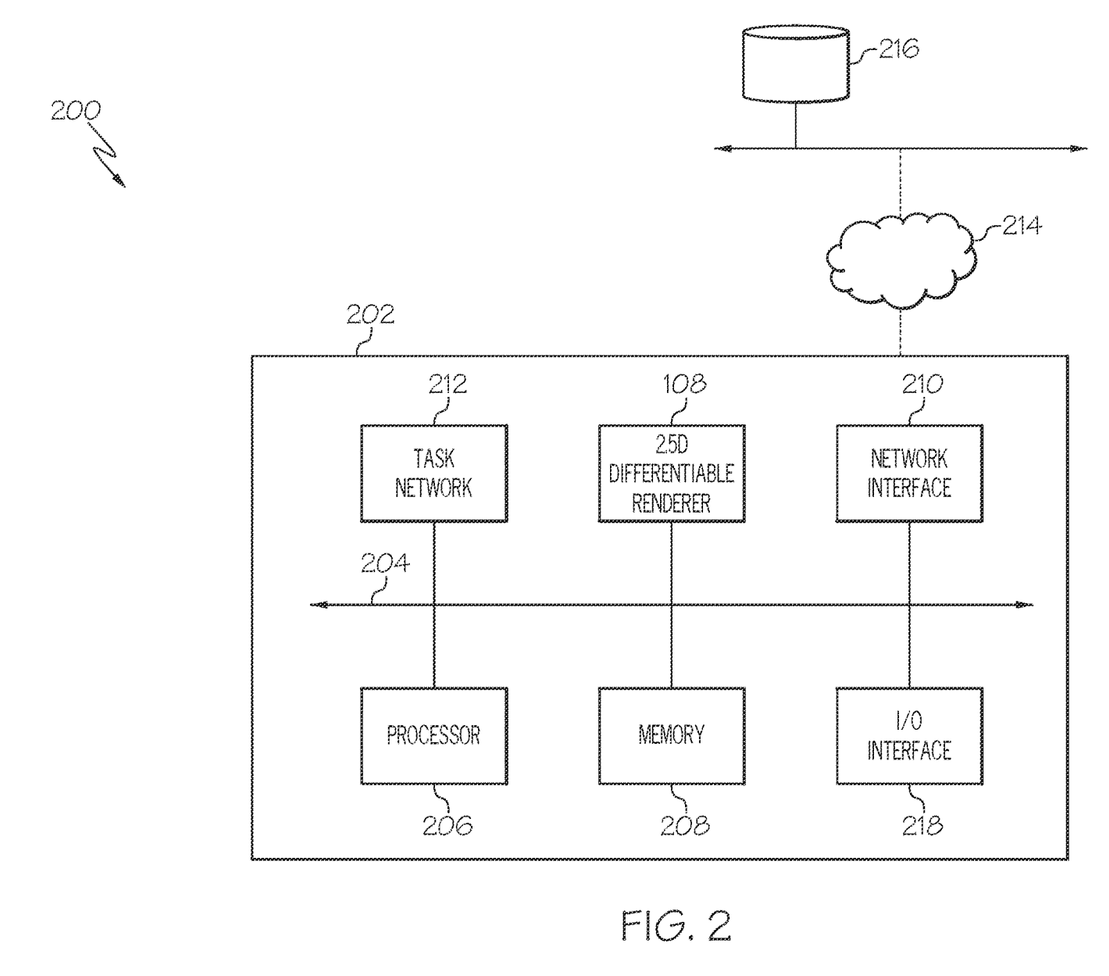
FIG. 2 depicts an illustrative system for generating training data for a downstream task network, according to one or more embodiments shown and described herein.

Referring now to FIG. 2, a system 200 including a computing device 202 for executing the methods described herein is depicted. The computing device 202 may comprise a processor 206, a memory module 208, a network interface 210, an input/output interface (110 interface 218), a 2.5D differentiable renderer 108, and a task network 212. The computing device 202 also may include a communication path 204 that communicatively connects the various components of the computing device 202. The computing device 202 may connect to external computing devices 216 via a network 214. It should be understood that the components of the computing device 202 described are exemplary and may contain more or less than the number of components shown in FIG. 2.

The processor 206 may include one or more processors that may be any device capable of executing machine-readable and executable instructions. Accordingly, each of the one or more processors of the processor 206 may be a controller, an integrated circuit, a microchip, or any other computing device. The processor 206 is coupled to the communication path 204 that provides signal connectivity between the various components of the computing device 202. Accordingly, the communication path 204 may communicatively couple any number of processors of the processor 206 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

The communication path 204 may be formed from any medium that is capable of transmitting a signal such as, e.g., conductive wires, conductive traces, optical waveguides, and the like. In some embodiments, the communication path 204 may facilitate the transmission of wireless signals, such as Wi-Fi, Bluetooth, Near-Field Communication (NEC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory module 208 is communicatively coupled to the communication path 204 and may contain one or more memory modules comprising RAM, ROM, flash memories, hard drives, or any device capable of storing machine-readable and executable instructions such that the machine-readable and executable instructions can be accessed by the processor 206. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory module 208. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The I/O interface 218 is coupled to the communication path 204 and may contain hardware for receiving input and/or providing output. Hardware for receiving input may include devices that send information to the processor 206. For example, a keyboard, mouse, scanner, touchscreen, and camera are all I/O devices because they provide input to the processor 206. Hardware for providing output may include devices from which data is sent. For example, an electronic display, speaker, and printer are all I/O devices because they output data from the processor 206.

The computing device 202 also comprises network interface 210. The network interface 210 is communicatively coupled to the communication path 204. The network interface 210 can be any device capable of transmitting and/or receiving data via a network or other communication mechanisms. Accordingly, the network interface 210 can include a communication transceiver for sending and/or receiving any wired or wireless communication. For example, the network interface 210 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices.

The network interface 210 communicatively connects the computing device 202 to external systems, such as external computing devices 216, via a network 214. The network 214 may be a wide area network, a local area network, a personal area network, a cellular network, a satellite network, and the like.

The system 200 may also include external computing devices 216. The external computing devices 216 may be one or more computing devices that may be in remote communication with the computing device 202 via network 214. The external computing devices 216 may include desktop computer, laptop computers, smartphones, and any other type of computing device in communication with the computing device 202 to request synthetic training data. The external computing devices 216 may also include services that operate beyond the computing device 202 that may be utilized by or may utilize the computing device 202, such as external databases, storage devices, compute platforms, and any other type of service.

The 2.5D differentiable renderer 108 may be a hardware module coupled to the communication path 204 and communicatively coupled to the processor 206. The 2.5 differentiable renderer 108 may also or instead be a set of instructions contained in the memory module 208. The 2.5D differentiable renderer 108 is configured to augment images to generate training data for a downstream task network, such as the task network 212. Augmenting images may be performed with an encoder-decoder convolutional neural network 110 that receives inputs include at least material properties and/or lighting conditions. The encoder-decoder convolutional neural network 110 may output a plurality of images under direct and indirect lighting conditions. The plurality of images under direct and indirect lighting conditions may also have a plurality of images under different material properties. Different material properties may include varying levels of lighting diffusion. The final image may be computed by a combination (e.g., a linear combination) of the outputs to approximate ray tracing on the input image.

The task network 212 may be a hardware module coupled to the communication path 204 and communicatively coupled to the processor 206. The task network 212 may also or instead be a set of instructions contained in the memory module 208. The task network 212 is configured to perform a machine learning task such as 3D detection, depth estimation, panoptic segmentation, classification, pose estimation, recognition, and/or the like. Additionally or alternatively, the task network 212 may be a downstream task network used to evaluate the quality of features learned by the 2.5D differentiable renderer 108.

It should be understood that the components illustrated in FIG. 2 are merely illustrative and are not intended to limit the scope of this disclosure. More specifically, while the components in FIG. 2 are illustrated as residing within computing device 202, this is a non-limiting example. In some embodiments, one or more of the components may reside external to computing device 202. In some embodiments, the computing device 202 may exist as a virtual machine operating within a host machine alongside other virtual machines, each of which shares the same computing resources belonging to the host machine.

Figure 3:
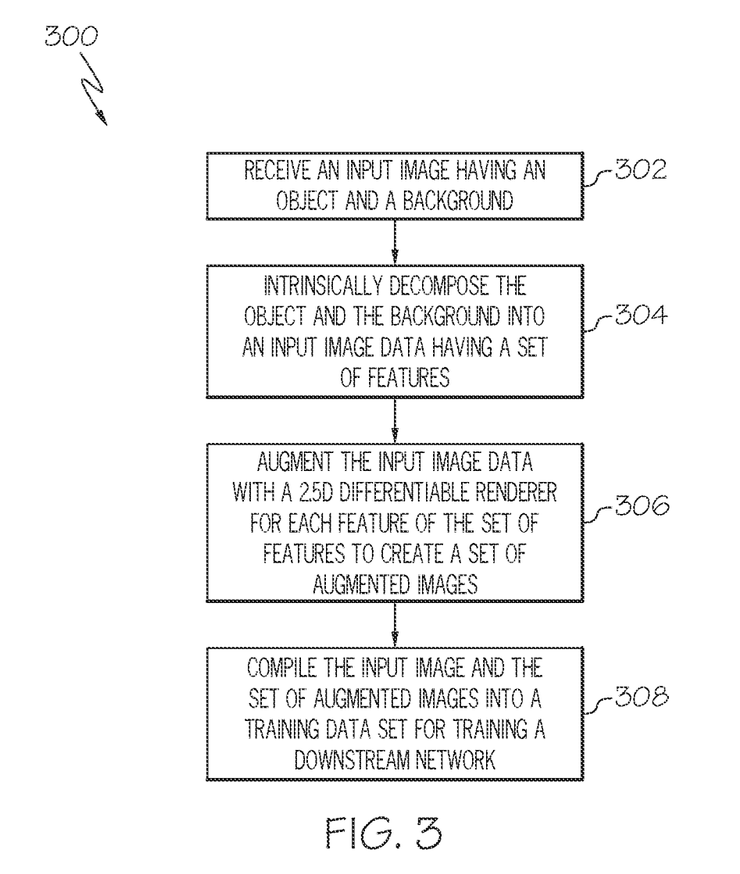
FIG. 3 depicts an illustrative method for generating training data for a downstream task network, according to one or more embodiments shown and described herein.

Referring now to FIG. 3, a method 300 for generating training data for a downstream task network is depicted. The discussion of FIG. 3 will be made with reference to FIGS. 1, 2. The method 300 may be performed by a computing device such as computing device 202. In some embodiments, the method 300 may be performed in real time as input image 102 is received by the computing device 202. At block 302, the computing device 202 may receive an input image, such as input image 102. The input image 102 may have an object and a background. The input image 102 may be in any digital format, such as PEG, PNG, DNG, and the like.

At block 304, the computing device 202 may intrinsically decompose the object and the background (either are referred to singularly as an "object") into an input image data having a set of features. Intrinsic decomposition of an image may include separating an image into its formation components (referred to herein as "features"). The intrinsic decomposition and encoding for the material features may be performed by the material network 103, and the intrinsic decomposition and encoding for the lighting features may be performed by the lighting network 104.

In terms of materials, material features may include at least one of color, specularity, and roughness. Color may include the color of the object, and in some embodiments, regardless of camera view and/or lighting conditions. Specularity may include the reflectance (or albedo) of the object. Roughness may include illumination effects depending on the camera viewpoint and object geometry, including shadows, shading, and inter-reflections.

In terms of lighting, lighting features may include at least one of source position, color, and intensity. Source position may include the position and direction of the lighting. Color may include a color temperature, which may in turn affect the frequency of light rays emitted from the light source as well as the color of the object. Intensity may include an amplitude of the light rays from the light source, which may in turn affect the brightness of the object as well as the number of surface reflects or retransmissions of each light ray. The variations in material features and the variations in lighting features of the input image 102 may be encoded and combined to create a data set of the set of features.

At block 306, the computing device 202 may augment the input image data with a 2.5D differentiable renderer 108 for each feature of the set of features. The 2.5D differentiable renderer 108 receives an input data set having at least a set of material features and a set alighting features based on the input image data. Accordingly, the combined set of features from generated from block 304 may be used as input for the 2.5D differentiable renderer 108.

The 2.5D differentiable renderer 108 may operate as a neural ray tracing approximator to generate a high fidelity rending based on the input data set. Instead of outputting a final image 116 directly, the 2.5D differentiable renderer 108 generates intermediate images 112 under direct and indirect lighting conditions as well as varying material conditions that can be combined to form the final image 116. The 2.5D differentiable renderer 108 may comprise an encoder-decoder convolutional neural network 110 that receives at least material properties and/or lighting conditions of the input image 102 to generate at least simulated material conditions and/or simulated lighting conditions.

After generating simulated lighting conditions and/or simulated material conditions, the 2.5D differentiable renderer 108 may apply the simulated lighting conditions and/or the simulated material conditions to the input data set to generate an output data set (e.g., the intermediate images 112). Particularly, for each simulated lighting conditions, an intermediate image 112 may be generated for each simulated material condition. For example, if there is one indirect lighting condition and one direct simulated lighting condition as well as one glossy and one diffuse simulated material condition, then there should be four intermediate images 112. The output data set (e.g., the intermediate images 112) may then be combined to generate an augmented image (e.g., the final image 116). Further discussion of block 306 is held with regard to FIG. 4.

At block 308, the computing device 202 may compile the input image 102 and/or the final image 116 into a training data set for training a downstream task network 212. More than one final image 116 with different lighting and/or material features may be generated by performing repeating any or all of block 306. Block 308 may also include preparing the final images 116 for use by a downstream task network 212. For example, the final images 116 may be converted to an appropriate image format and stored in a database on an external computing device 216.

Figure 4:
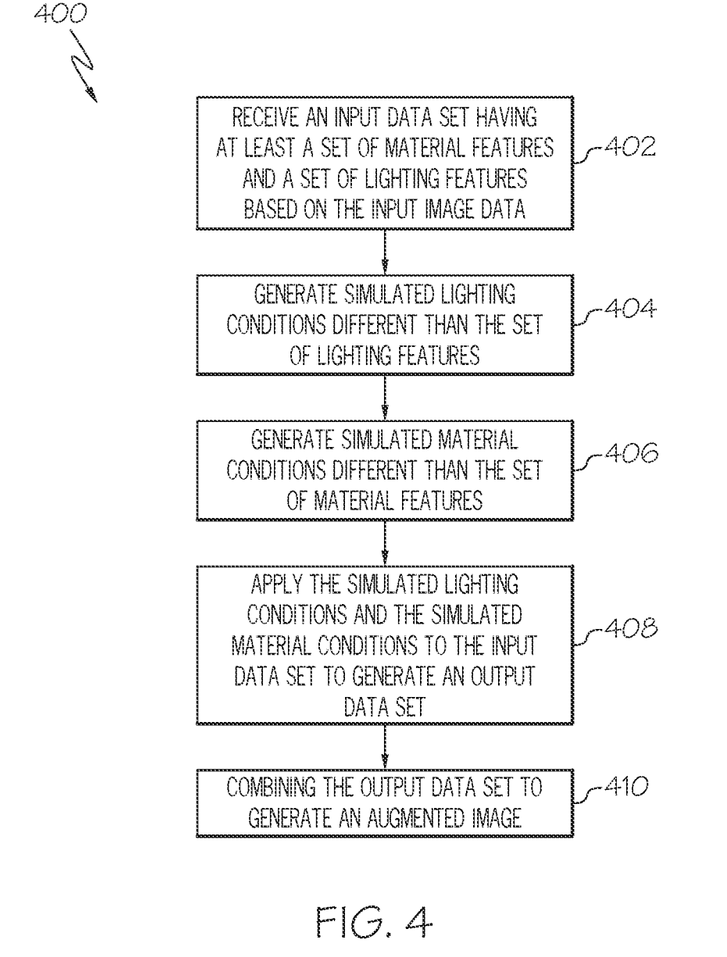
FIG. 4 depicts an illustrative method for augmenting input images, according to one or more embodiments shown and described herein.

Referring now to FIG. 4, a method 400 for augmenting input images is depicted. The discussion of FIG. 4 will be made with reference to FIGS. 1, 2, 3. The method 400 may be performed by a computing device, which may be the computing device 202 that engages in workflow 100 and method 300 described above. Method 400 may correspond to block 306 discussed above. In some embodiments, the method 400 may be performed in real time as input image 102 is received by the computing device 202. At block 402, the 2.5D differentiable renderer 105 may receive an input data set having at least a set of material features and a set of lighting features based on the input image 102.

At block 404, simulated lighting conditions different than the set of lighting features may be generated. Generating the simulated lighting conditions may include generating a direct lighting condition having light rays from at least one of a light source, an object surface, a background, and ambient occlusion, after one or fewer reflections off of a surface. Generating the simulated lighting conditions may also include generating an indirect lighting condition having light rays from at least one of a light source, an object surface, a background, after more than one reflections off of a surface.

Simulated lighting conditions may be different than the set of lighting features of the input image 102 so that augmentations of the input image 102 may be created. For example, the simulated lighting conditions may randomize the lighting conditions, such as the direct and indirect lighting. Each randomization may be used to create another intermediate image 112. Direct lighting may include lighting emitted from a light source, object surfaces, background surfaces, and/or ambient occlusion after a single reflection or transmission of a light ray off of a surface. Indirect lighting may include lighting originating from the light source, object surfaces, and/or background surfaces after more than one reflection or transmission of a light ray off of a surface.

At block 406, simulated material conditions different than the set of material features may be generated. Generating the simulated material conditions may include generating a diffuse material condition off of which light rays are diffusely reflected. Generating the simulated material conditions may also include generating a glossy material condition off of which light rays are specularly reflected. Simulated material conditions may also include an object albedo and/or probability that light is reflected for each wavelength to randomly vary the simulated lighting conditions over a particular simulated material condition.

Simulated material conditions may be different than the set of material features of the input image 102 so that further augmentations of the input image 102 may be created. For example, the simulated material conditions may randomize on surface texture, such as diffuse and glossy. For each direct and indirect lighting of the simulated lighting conditions, the 2.5D differentiable renderer 108 simulate multiple material features, such as diffuse and glossy materials. To simulate such materials, the 2.5D differentiable renderer 108 may apply a bidirection scattering distribution function (BSDF) the object surface. Diffuse BSDF may be used to add Lambertian and/or Oren-Nayer diffuse reflections, whereas glossy BSDF may add reflections with microfacet distribution to represent materials such as metal or mirrors.

At block 408, the simulated lighting conditions and the simulated material conditions may be applied to the input data set to generate an output data set. Applying the simulated lighting conditions and the simulated material conditions to the input data set may include generating an intermediate image 112 for each combination of the simulated material conditions and the simulated lighting conditions to form a plurality of intermediate images 112.

The 2.5D differentiable renderer 108 may apply the simulated lighting conditions and/or the simulated material conditions to the input data set to generate an output data set (i.e., the intermediate images 112). Particularly, for each simulated lighting conditions, an intermediate image 112 may be generated for each simulated material condition. For example, if there is one indirect lighting condition and one direct simulated lighting condition as well as one glossy and one diffuse simulated material condition, then there should be four intermediate images 112.

At block 410, the output data set may be combined to generate an augmented image. The output data set may be the intermediate images 112 and the augmented image may be the final image 116, The final image 116 can be computed by calculating a linear combination of the intermediate images 112. For example, the final image 116 may be represented by the following formula:

$$\text{Image}_{final} = (D_{dir} + D_{ind}) * D_{col} + (G_{dir} + G_{ind}) * G_{col},$$

where D represents an image of an object having a diffuse material property, G represents an image of an object having a glossy material property, dir represents an image of an object having a direct lighting condition, ind represents an image of an object having an indirect lighting condition, $D_{col}$ represents an object albedo, and $G_{col}$ represents a probability that light is reflected for each wavelength of light under the simulated lighting condition.

More than one final image 116 with different lighting and/or material features may be generated by performing repeating any or all of method 400. For example, $D_{col}$ and/or $G_{col}$ may be randomized to create different final images 116.

Figure 5:
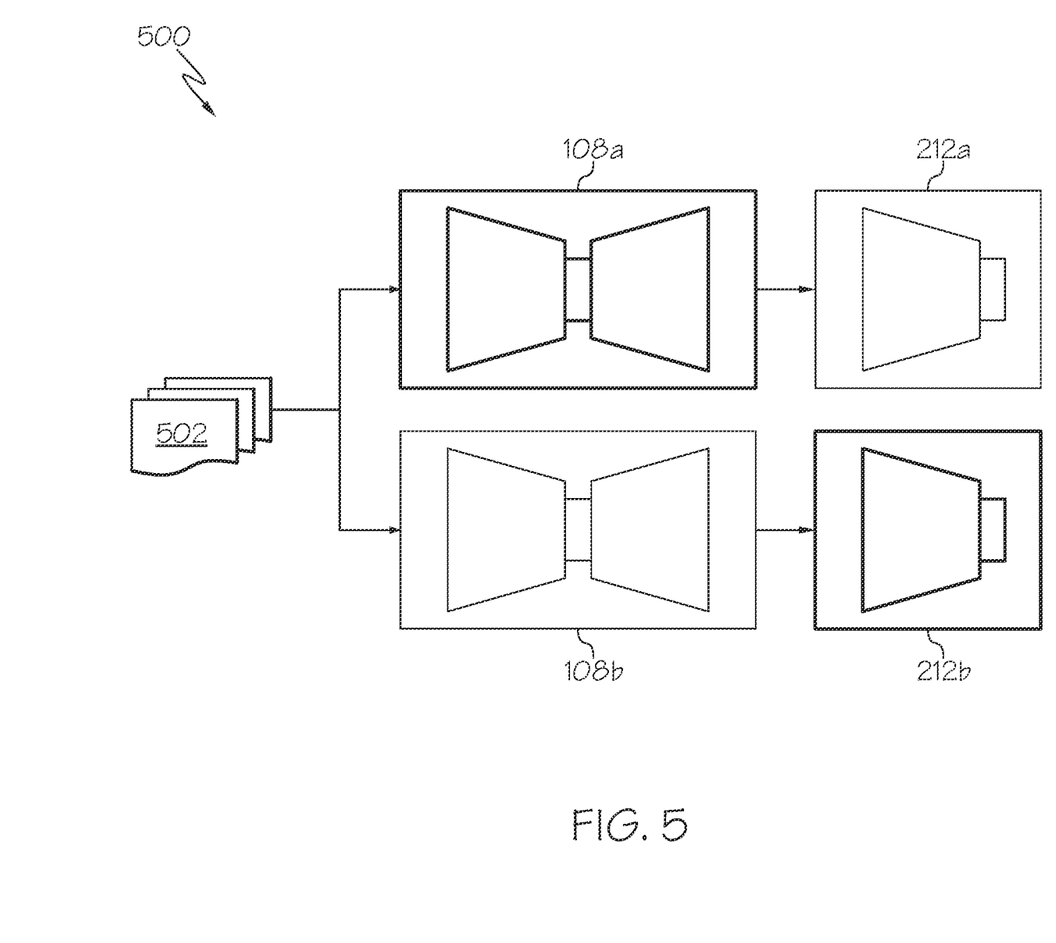
FIG. 5 depicts an illustrative workflow for task-adaptive domain randomization, according to one or more embodiments shown and described herein.

Referring now to FIG. 5, a workflow 500 for task-adaptive domain randomization is depicted. The discussion of FIG. 4 will be made with reference to FIGS. 2, 3. The workflow 500 may be performed by a computing device, such as computing device 202. To recall, the issue of the domain gap in generating synthetic data for training task networks is often attempted to be resolved by domain adaptation or domain randomization. The problem with domain adaptation, however, is that it requires real data, even if unlabeled, and it does not generalize well because it attempts to fit a model to a limited distribution. In addition, it does not work well in cases where no material information is available in synthetically generated data. The problem with domain randomization is it has no access to any target domain and randomly perturbs the source data during training to make the task networks more robust to perceptual differences. This approach is generally unguided and often needs an exhaustive evaluation to find meaningful augmentations that increase the target domain performance.

The workflow 500 is a task-adaptive domain randomization approach. Under this approach, a neural network may be trained to learn a plausible distribution of augmentations over lighting and material that maximize the performance of the neural network for different downstream tasks, such as 3D detection, depth estimation, panoptic segmentation, and/or the like for different real data sets. Training the downstream task network 212 comprises minimizing a loss function of the downstream task network 212a, wherein weights of the 2.5D differentiable renderer 108a are fixed and weights of the downstream task network 212a are changed based on the minimization of the loss function. Training the downstream task network 212 further comprises maximizing the loss function of the downstream task network 212b, wherein the weights of the 2.5D differentiable renderer 108b are changed based on the maximization of the loss function and the weights of the downstream task network 212b are fixed. The input images 502 may be real images, such as input image 102, and/or augmented images, such as final image 116.

In some embodiments, training the downstream task network 212 comprises minimizing a loss function of the downstream task network 212a, wherein weights of the 2.5D differentiable renderer 108a are changed based on the minimization of the loss function and weights of the downstream task network 212a are fixed. Training the downstream task network 212 further comprises maximizing the loss function of the downstream task network 212b, wherein the weights of the 2.5D differentiable renderer 108b are fixed and the weights of the downstream task network 212b are changed based on the maximization of the loss function. The input images 502 may be real images, such as input image 102, and/or augmented images, such as final image 116.

It should now be understood that embodiments disclosed herein include methods and systems for guided domain randomization via differentiable dataset rendering. In embodiments disclosed herein, 2.5D differentiable renderer may generate approximate a ray tracer to generate photo realistic training data for a downstream task network. The 2.5D differentiable renderer randomizes over lighting and material features of an input image to produce augmented images.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method, comprising:
    receiving an input image having an object and a background;
    intrinsically decomposing the object and the background into an input image data having a set of features;
    augmenting the input image data with a 2.5D differentiable renderer for each feature of the set of features to create a set of augmented images; and
    compiling the input image and the set of augmented images into a training data set for training a downstream task network;
    wherein augmenting the input image with the 2.5D differentiable renderer comprises:

receiving with the 2.5D differentiable renderer an input data set having at least a set of material features and a set of lighting features based on the input image data;

generating simulated lighting conditions different than the set of lighting features;

generating simulated material conditions different than the set of material features;

applying the simulated lighting conditions and the simulated material conditions to the input data set to generate an output data set; and combining the output data set to generate an augmented image.

2. The method of claim 1, wherein intrinsically decomposing the input image data into the set of features comprises:

generating a set of material features including at least one of color, specularity, and roughness; and generating a set of lighting features including at least one of source position, color, and intensity.

3. The method of claim 1, wherein generating the simulated lighting conditions comprises:

generating a direct lighting condition having light rays from at least one of a light source, an object surface, a background, and ambient occlusion, after one or fewer reflections off of a surface; and generating an indirect lighting condition having light rays from at least one of a light source, an object surface, a background, after more than one reflections off of a surface.

4. The method of claim 1, wherein generating the simulated material conditions comprises:

generating a diffuse material condition off of which light rays are diffusely reflected; and generating a glossy material condition off of which light rays are specularly reflected.

5. The method of claim 1, wherein applying the simulated lighting conditions and the simulated material conditions to the input data set comprises generating an intermediate image for each combination of the simulated material conditions and the simulated lighting conditions to form a plurality of intermediate images.

6. The method of claim 1, wherein combining the output data set to generate the augmented image comprises calculating a linear combination of the output data set.

7. The method of claim 1, wherein augmenting the input image with the 2.5D differentiable renderer for each feature of the set of features occurs in real-time.

8. The method of claim 1, wherein training the downstream task network comprises:

minimizing a loss function of the downstream task network, wherein weights of the 2.5D differentiable renderer are fixed and weights of the downstream task network are changed based on the minimization of the loss function; and maximizing the loss function of the downstream task network, wherein the weights of the 2.5D differentiable renderer are changed based on the maximization of the loss function and the weights of the downstream task network are fixed.

9. A system, comprising:
a processor; and
a memory module storing machine-readable instructions that, when executed by the processor, cause the processor to perform operations comprising:

receiving an input image having an object and a background;

intrinsically decomposing the object and the background into an input image data having a set of features;

augmenting the input image data with a 2.5D differentiable renderer for each feature of the set of features to create a set of augmented images; and compiling the input image and the set of augmented images into a training data set for training a downstream task network;

wherein augmenting the input image with the 2.5D differentiable renderer comprises:

receiving with the 2.5D differentiable renderer an input data set having at least a set of material features and a set of lighting features based on the input image data;

generating simulated lighting conditions different than the set of lighting features;

generating simulated material conditions different than the set of material features;

applying the simulated lighting conditions and the simulated material conditions to the input data set to generate an output data set; and combining the output data set to generate an augmented image.

10. The system of claim 9, wherein intrinsically decomposing the input image data into the set of features comprises:

generating a set of material features including at least one of color, specularity, and roughness; and generating a set of lighting features including at least one of source position, color, and intensity.

11. The system of claim 9, wherein generating the simulated lighting conditions comprises:

generating a direct lighting condition having light rays from at least one of a light source, an object surface, a background, and ambient occlusion, after one or fewer reflections off of a surface; and generating an indirect lighting condition having light rays from at least one of a light source, an object surface, a background, after more than one reflections off of a surface.

12. The system of claim 9, wherein generating the simulated material conditions comprises:

generating a diffuse material condition off of which light rays are diffusely reflected; and generating a glossy material condition off of which light rays are specularly reflected.

13. The system of claim 9, wherein applying the simulated lighting conditions and the simulated material conditions to the input data set comprises generating an intermediate image for each combination of the simulated material conditions and the simulated lighting conditions to form a plurality of intermediate images.

14. The system of claim 9, wherein combining the output data set to generate the augmented image comprises calculating a linear combination of the output data set.

15. The system of claim 9, wherein augmenting the input image with the 2.5D differentiable renderer for each feature of the set of features occurs in real-time.

16. The system of claim 9, wherein training the downstream task network comprises:

minimizing a loss function of the downstream task network, wherein weights of the 2.5D differentiable renderer are fixed and weights of the downstream task network are changed based on the minimization of the loss function; and maximizing the loss function of the downstream task network, wherein the weights of the 2.5D differentiable renderer are changed based on the maximization of the loss function and the weights of the downstream task network are fixed.

17. A non-transitory computer-readable medium having machine-readable instructions that, when executed by a processor, cause the processor to perform operations comprising:
- receiving an input image having an object and a background;
- intrinsically decomposing the object and the background into an input image data having a set of features;
- augmenting the input image data with a 2.5D differentiable renderer for each feature of the set of features to create a set of augmented images; and
- compiling the input image and the set of augmented images into a training data set for training a downstream task network;
- wherein augmenting the input image with the 2.5D differentiable renderer comprises:
  - receiving with the 2.5D differentiable renderer an input data set having at least a set of material features and a set of lighting features based on the input image data;
  - generating simulated lighting conditions different than the set of lighting features;
  - generating simulated material conditions different than the set of material features;
  - applying the simulated lighting conditions and the simulated material conditions to the input data set to generate an output data set; and
  - combining the output data set to generate an augmented image.

* * * * *

UNITED STATES PATENT AND TRADEMARK OFFICE
CERTIFICATE OF CORRECTION

| | | |
|---|---|---|
| PATENT NO. | : 12,136,251 B2 | Page 1 of 1 |
| APPLICATION NO. | : 17/579370 | |
| DATED | : November 5, 2024 | |
| INVENTOR(S) | : Sergey Zakharov et al. | |

It is certified that error appears in the above-identified patent and that said Letters Patent is hereby corrected as shown below:

In the Specification

In Column 4, Line(s) 38, delete "(NEC)" and insert --(NFC)--, therefor.

In Column 6, Line(s) 36, delete "PEG" and insert --JPEG--, therefor.

In Column 8, Line(s) 38, delete "bidirection" and insert --bidirectional--, therefor.

In Column 8, Line(s) 39, before "the", insert --to--.

In Column 9, Line(s) 1, delete "Image$_{final}$=($D_{fir}$+$D_{ind}$)*$D_{col}$+($G_{dir}$+$G_{ind}$)*$G_{col}$," and insert --Image$_{final}$ = ($D_{dir}$ + $D_{ind}$) * $D_{col}$ + ($G_{dir}$ + $G_{ind}$) * $G_{col}$,--, therefor.

Signed and Sealed this
Fifteenth Day of April, 2025

Coke Morgan Stewart
*Acting Director of the United States Patent and Trademark Office*